US012675393B2

(12) United States Patent (10) Patent No.: US 12,675,393 B2
Menhusen et al. (45) Date of Patent: Jul. 7, 2026

(54) EFFICIENT BURST SORT BASED ON NETWORK-ATTACHED MEMORY

(71) Applicant: Hewlett Packard Enterprise Development LP, Spring, TX (US)

(72) Inventors: Ryan D. Menhusen, Fort Collins, CO (US); Clarete Riana Crasta, Bangalore (IN); Syed Ismail Faizan Barmawer, Bangalore (IN); Darel Neal Emmot, Wellington, CO (US); David R. Emberson, Santa Cruz, CA (US); Sharad Singhal, Belmont, CA (US); Sajeesh Kumar K V, Bangalore (IN); Ramesh Chandra Chaurasiya, Bangalore (IN); Adya Sharma, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 28 days.

(21) Appl. No.: 18/760,105

(22) Filed: Jul. 1, 2024

(65) Prior Publication Data

US 2025/0335345 A1      Oct. 30, 2025

(30) Foreign Application Priority Data

Apr. 30, 2024     (IN) .............................. 202411034251

(51) Int. Cl.
*G06F 12/02*          (2006.01)
(52) U.S. Cl.
CPC ................................ *G06F 12/0223* (2013.01)

(58) Field of Classification Search
None
See application file for complete search history.

(56) References Cited

U.S. PATENT DOCUMENTS

| | | |
|---|---|---|
| 9,613,127 B1 | 4/2017 | Rus et al. |
| 10,705,951 B2 | 7/2020 | Patel et al. |
| 11,604,603 B2 | 3/2023 | Ivanov et al. |

(Continued)

OTHER PUBLICATIONS

"Distributed Sorting Algorithms", available online at <https://brunomaga.github.io/Distributed-Sort>, Jun. 21, 2014, 4 pages.

(Continued)

*Primary Examiner* — Giuseppi Giuliani
(74) *Attorney, Agent, or Firm* — Yao Legal Services, Inc.

(57) ABSTRACT

A system, by a processing entity (PE), determines records stored in a memory shared by other processing entities. A respective record comprises a key and a corresponding index indicating a physical location in the shared memory. The PE stores, in a DRAM partition, burst tree data obtained by performing a burst sort on a portion of the records. The PE moves data stored in the DRAM partition to a partition of the shared memory in response to a size of the stored data exceeding a predetermined threshold. The PE obtains sorted keys and corresponding indices for the records by sorting the burst tree data stored in shared memory partitions. The PE facilitates a sorted retrieval of the records in the shared memory while leaving the records in the respective physical location in the shared memory by writing the sorted keys and indices to the shared memory.

20 Claims, 7 Drawing Sheets

(56) References Cited

U.S. PATENT DOCUMENTS

| | | | |
|---|---|---|---|
| 11,836,128 B1 | 12/2023 | Trout | |
| 2013/0268770 A1* | 10/2013 | Hunt | G06F 16/2255 |
| | | | 713/189 |
| 2014/0059052 A1* | 2/2014 | Yamamoto | G06F 16/23 |
| | | | 707/741 |
| 2014/0214767 A1* | 7/2014 | Graefe | G06F 16/27 |
| | | | 707/645 |
| 2015/0212889 A1* | 7/2015 | Amarendran | G06F 11/2097 |
| | | | 707/674 |
| 2021/0133123 A1 | 5/2021 | Feehrer et al. | |

OTHER PUBLICATIONS

"Radix sort (LSD). Growing with the Web", available online at <https://www.growingwiththeweb.com/sorting/radix-sort-lsd/>, Dec. 28, 2016, 5 pages.

"Sort Benchmark Home Page", available online at <https://sortbenchmark.org/>, retrieved from internet on Jul. 24, 2024, 12 pages.

Github, "OpenFAM Reference Implementation", available online at <https://openfam.github.io/>, 2023, 2 pages.

IBM, "Range partitioning", available online at <https://prod.ibmdocs-production-dal-6099123ce774e592a519d7c33db8265e-0000.us-south.containers.appdomain.cloud/docs/en/iis/9.1?topic=operator-range-partitioning>, 2021, 2 pages.

Sinha et al., "Efficient Trie-Based Sorting of Large Sets of Strings", 2003, 8 pages.

"2025-CUG-DELEGATE-BOOK", available online at <https://cug.org/wp-content/uploads/2025/05/2025-CUG-DELEGATE-BOOK.pdf< 66 pages.

"Ehcache Documentation", available online at <https://web.archive.org/web/20240730182344/https://www.ehcache.org/documentation/>, Jul. 300, 2024, 3 pages.

Arpaci-Dusseau, "The Andrew File System (AFS)", Operating Systems [Version 1.10], 2008-23, 14 pages.

Gala et al., "Management of Multilevel, Multiclient Cache Hierarchies with Application Hints", ACM Transactions on Computer Systems (TOCS), vol. 29, Issue 2 Article No. 5, 2011, 52 pages.

Github, "daos-stack / daos", available online at <https://web.archive.org/web/20240217081407/http://github.com/daos-stack/daos>, Feb. 17, 2024, 3 pages/.

Github, "OpenFAM / OpenFAM", available online at <https://github.com/OpenFAM/OpenFAM/releases/tag/v3.0.0>, Feb. 1, 2023, 2 pages.

Github, "Openfam", available online at <https://web.archive.org/web/20240811135858/https://github.com/OpenFAM>, Aug. 11, 2024, 2 pages.

Jeffrey C. Mogul "Recovery in Spritely NFS", The USENIX Association, computing systems, vol. 7 . No. 2 . spring 1994, 63 pages.

K. Harms, "DAOS is your Future Distributed Asynchronous Object Store," available online at < https://www.alcf.anl.gov/sites/default/files/2023-10/DAOS-ALCF-HoW23.pdf>, Oct. 10-12, 2023, 17 pages.

M. Hennecke, "Understanding DAOS Storage Performance Scalability," in Proceedings of the HPC Asia 2023 Workshops, RaUles Blvd Singapore: ACM, Feb. 2023, pp. 1-14.

Moritz et al., "Ray: A Distributed Framework for Emerging AI Applications", Sep. 30, 2018, 17 pages.

Ousterhout et al., "The RAMCloud Storage System", ACM Transactions on Computer Systems, vol. 33, No. 3, Article 7, Publication date: Aug. 2015, 55 pages.

Petros Koutoupis, "The Lustre Distributed Filesystem", available online at <https://dl.acm.org/doi/fullHtml/10.5555/2062736.2062739>, 2011, 3 pages.

Qian et al., "LPCC: hierarchical persistent client caching for lustre" DataDirect Networks, 2016, 28 pages.

Qian et al., "Lustre Metadata Writeback Cache", 2023, 30 pages.

Redis, "Client-side caching reference", available online at <https://web.archive.org/web/20241001000827/https://redis.io/docs/latest/develop/reference/client-side-caching/>, Oct. 1, 2024, 12 pages.

Redis, "Redis Cache_ In-Memory Caching Solutions—Redis Enterprise", available online at <https://web.archive.org/web/20240409124118/https://redis.io/solutions/caching/>, Jul. 2024, 8 pages.

Singhal et al., "OpenFAM: Programming disaggregated memory", Sep. May 2-5, 2022, 13 pages.

Srinivasan et al., "Spritely NFS: Experiments with Cache-Consistency Protocols", 1989, ACM, 13 pages.

Strati et al., "Orion: Interference-aware, Fine-grained GPU Sharing for ML Applications", ACM, 2024, 18 pages.

Tang et al., "Toward Scalable and Asynchronous Object-Centric Data Management for HPC," 2018 18th IEEE/ACM International Symposium on Cluster, Cloud and Grid Computing (CCGRID), 10 pages.

Thomson Reuters, "Whitepaper", available online at <https://www.thomsonreuters.com/content/dam/openweb/documents/pdf/tr-com-financial/white-paper/keybridge-sbdi-whitepaper.pdf>, May 2013, 9 pages.

WEKA "WEKA Data Platform Architecture", Feb. 2025, 40 Pages.

WEKA, "NeuralMesh by WEKA Architecture Whitepaper—WEKA", available online at <https://www.weka.io/resources/white-paper/wekaio-architectural-whitepaper/>, 5, 49 pages.

Zhang et al., "Optimizing Data Movement for GPU-Based In-Situ Workflow Using GPUDirect RDMA", In Euro-Par 2023: Parallel Processing: 29th International Conference on Parallel and Distributed Computing, 2023, 15 pages.

* cited by examiner

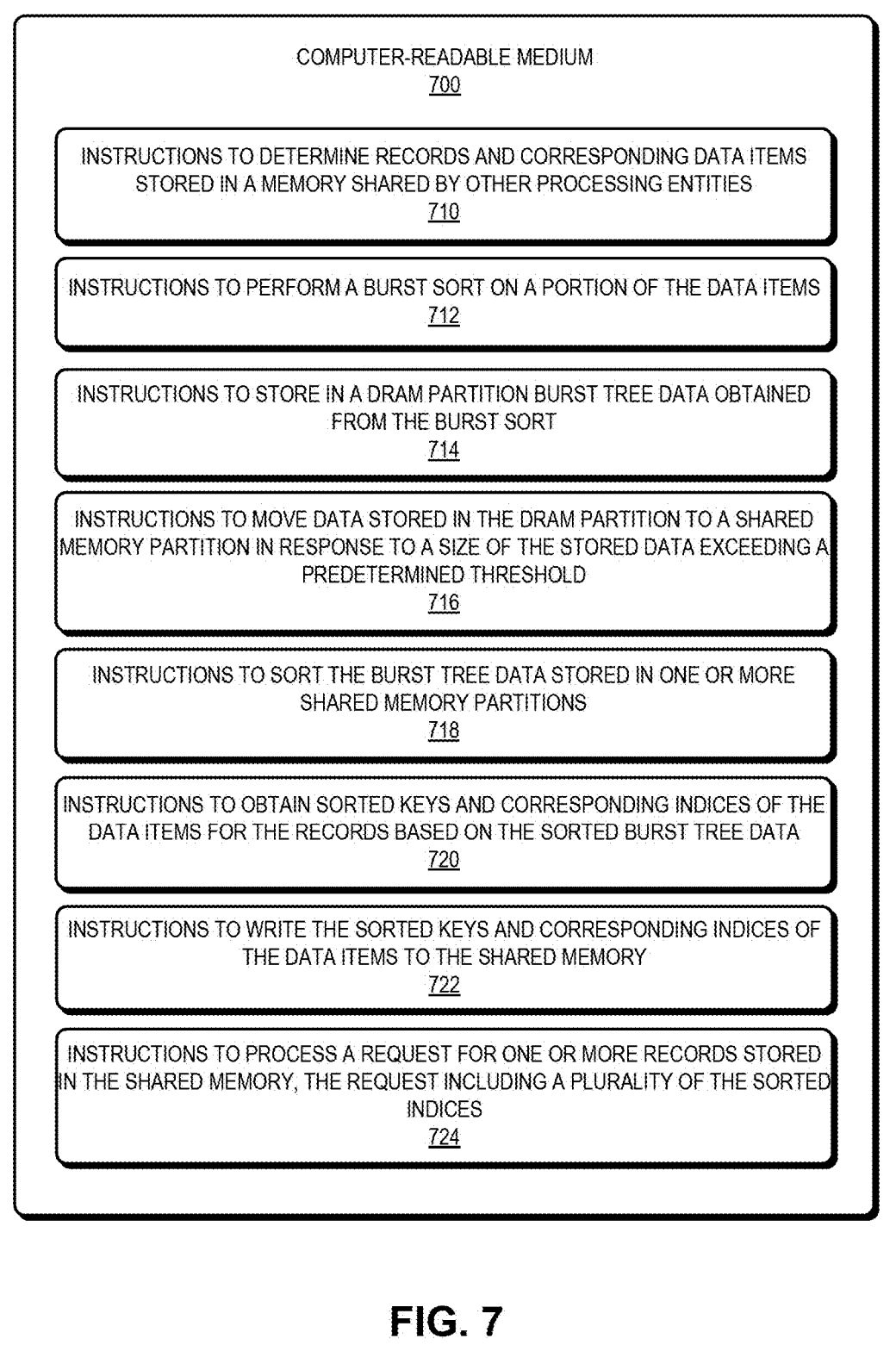

COMPUTER-READABLE MEDIUM
700

INSTRUCTIONS TO DETERMINE RECORDS AND CORRESPONDING DATA ITEMS
STORED IN A MEMORY SHARED BY OTHER PROCESSING ENTITIES
710

INSTRUCTIONS TO PERFORM A BURST SORT ON A PORTION OF THE DATA ITEMS
712

INSTRUCTIONS TO STORE IN A DRAM PARTITION BURST TREE DATA OBTAINED
FROM THE BURST SORT
714

INSTRUCTIONS TO MOVE DATA STORED IN THE DRAM PARTITION TO A SHARED
MEMORY PARTITION IN RESPONSE TO A SIZE OF THE STORED DATA EXCEEDING A
PREDETERMINED THRESHOLD
716

INSTRUCTIONS TO SORT THE BURST TREE DATA STORED IN ONE OR MORE
SHARED MEMORY PARTITIONS
718

INSTRUCTIONS TO OBTAIN SORTED KEYS AND CORRESPONDING INDICES OF THE
DATA ITEMS FOR THE RECORDS BASED ON THE SORTED BURST TREE DATA
720

INSTRUCTIONS TO WRITE THE SORTED KEYS AND CORRESPONDING INDICES OF
THE DATA ITEMS TO THE SHARED MEMORY
722

INSTRUCTIONS TO PROCESS A REQUEST FOR ONE OR MORE RECORDS STORED
IN THE SHARED MEMORY, THE REQUEST INCLUDING A PLURALITY OF THE SORTED
INDICES
724

FIG. 7

EFFICIENT BURST SORT BASED ON NETWORK-ATTACHED MEMORY

STATEMENT OF GOVERNMENT-FUNDED RESEARCH

This invention was made with Government support under Contract Number H98230-15-D-0022/0003 awarded by the Maryland Procurement Office. The Government has certain rights in the invention.

BACKGROUND

Field

Sorting increasingly large amounts of data can be an important task in current computer systems. Sorting techniques work more efficiently when the data being sorted is available in the local memory of a node. With large datasets, distributed sorting techniques can use multiple parallel nodes, which may require data exchange during various phases of the sorting technique. In addition, the amount of available local memory on a node may require multiple passes and exchange of intermediate data among the nodes. These constraints may limit the performance of distributed sorting techniques.

BRIEF DESCRIPTION OF THE FIGURES

FIG. 7 illustrates a computer-readable medium which facilitates efficient burst sort based on network-attached memory, in accordance with an aspect of the present application.

In the figures, like reference numerals refer to the same figure elements.

DETAILED DESCRIPTION

Figure 1:
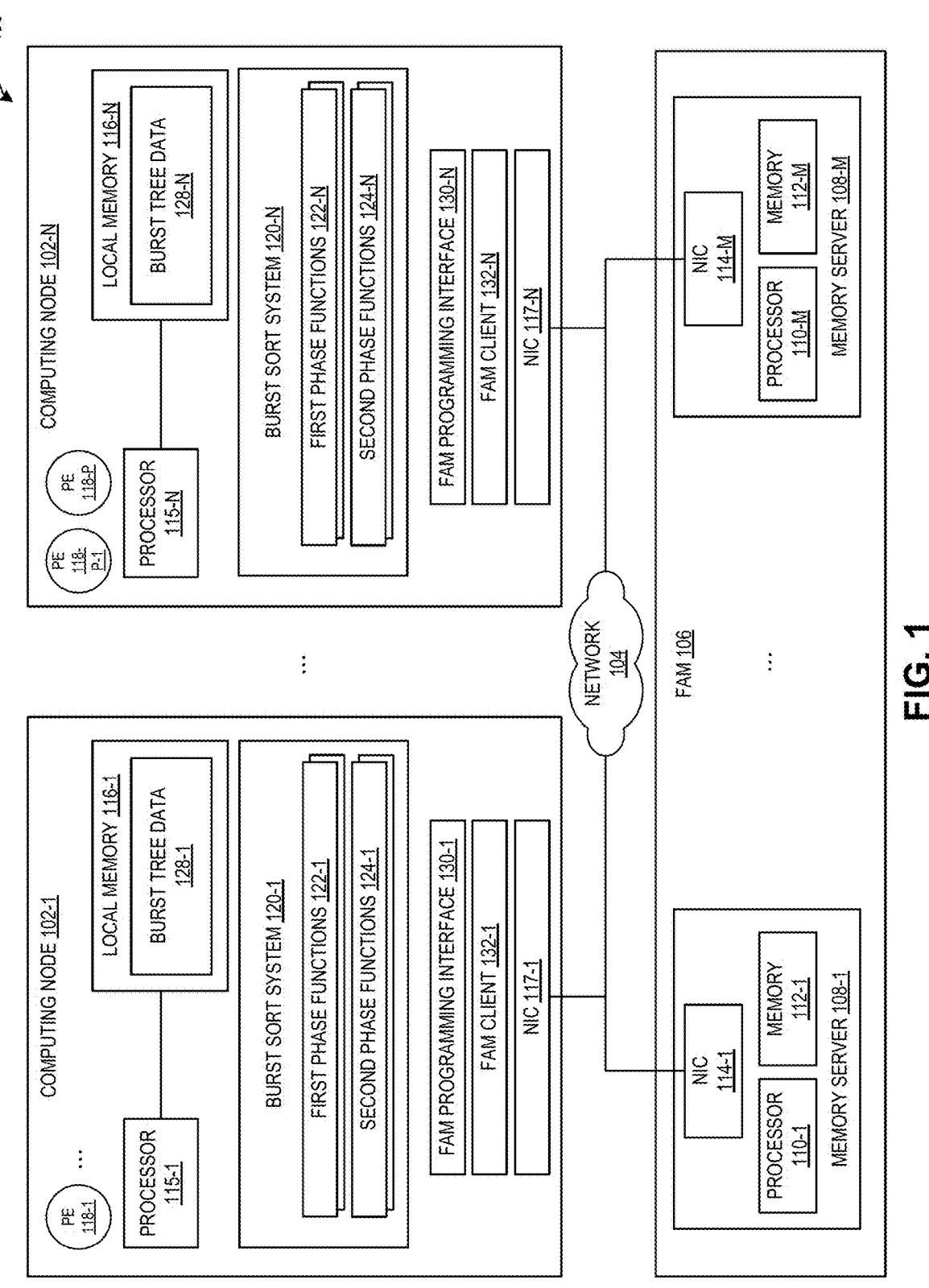
FIG. 1 illustrates an environment which facilitates efficient burst sort based on network-attached memory, in accordance with an aspect of the present application.

Aspects of the instant application address performance limitations of distributed sorting techniques by providing a sorting technique which processes existing data with a single exchange or synchronization point in order to minimize communication between multiple nodes and also enables incremental updates without restarting the sorting technique. In some aspects, the sorting technique leverages a network-attached memory shared among the multiple nodes for incremental construction of a large, shared data structure. The described sorting technique also creates work queues for dynamic coordination between processing entities of the nodes while minimizing communication exchange between the processing entities.

In a distributed environment with multiple computing nodes, sorting techniques work more efficiently when the data being sorted is available in the local memory of a node. However, the available capacity of the local memory of a node may limit the amount of data capable of being sorted. Distributed sorting techniques can use multiple parallel nodes. However, data may need to be accessed from secondary storage in multiple passes and coordination between the nodes may result in a significant amount of data exchange between the nodes. Furthermore, current solutions are generally optimized for uniformly distributed data and may perform poorly on data which is not uniformly distributed.

Aspects of the instant application can address these limitations by providing a sorting technique which is a variant of a "burst sort" technique adapted for a network-attached memory. Given a data set of input records to be sorted, existing burst sort techniques can build a "trie" (i.e., a digital tree or a prefix tree) to store prefixes of strings, by placing suffixes into limited size "buckets." A bucket can include suffixes corresponding to keys for input records which share similar prefixes. When a bucket reaches its limit (i.e., a predetermined threshold), the bucket can "burst" into a new trie. Existing burst sort techniques can be similar to radix sort (a linear sorting technique that distributes elements into buckets by processing them digit by digit), but may be faster than radix sort for large data sets because burst sort can place related radixes closer together, as described below in relation to FIG. 2. However, using burst sort alone may not scale well with an increase in the number of computing nodes and processing entities. Similarly, using only a network-attached memory to store the input records which are to be sorted by burst sort cannot solve the communication overhead involved when the input records are distributed between the computing nodes and processing entities.

The described aspects can efficiently use both burst sort and network-attached memory to improve sort performance of input records by overlapping sort logic with communication, which can result in reduced communication and coordination between the computing nodes. In one aspect, an environment can include a network of multiple computing nodes, which can each include multiple processing entities (PEs). The input records can be stored in a shared memory which is a memory resource attached to the network of computing nodes (also referred to as a "network-attached memory"). An example of a network-attached memory is a fabric-attached memory (FAM). While some aspects described herein depict FAM as the network-attached memory, the instant application is not limited to FAM and can include other globally accessible memory, e.g., Compute Express Link (CXL) global fabric attached memory (GFAM). The input records can each include a key and a payload. The system can gather or extract the key from a respective input "record" and generate a "data item" corresponding to the input record. The data item can include the key and a pointer or index indicating a physical location in the shared memory at which the input record is stored. A key-payload pair of an input record is generally significantly larger than the key-index pair of the corresponding data item.

The described aspects can include two phases of operation and assume that records and corresponding data items are stored in memory shared by multiple PEs. Each record includes a key and a payload, and each corresponding data item includes the key and a corresponding index or pointer to a physical location in the shared memory at which the respective record is stored. In the first phase, each PE can independently obtain a portion of the data items, perform a burst sort on the keys in its obtained portion, and store the resulting burst tree data (i.e., the trie) in a partition in dynamic random access memory (DRAM) associated with the PE. When a DRAM partition exceeds a certain size, the burst tree data is moved from the DRAM partition to a FAM partition. At the end of the first phase, the FAM can include unsorted partitions, where each partition includes sorted burst tree portions which may share a common prefix or key. The sorted burst tree portions can contain fewer records than a predetermined threshold.

In the second phase, the system can generate work queue tasks for the FAM partitions. Each PE can obtain certain tasks for partitions with similar prefixes and sort the combined partitions. The sort which occurs in the second phase can be based on, e.g., a comparison sort, a quicksort, or a count sort. When the tasks in the work queue are completed, the result can be a list of sorted data items (i.e., sorted keys and corresponding indices), which can be written to FAM and subsequently used to retrieve sorted records from FAM without needing to move the actual records in FAM. The records are generally much larger in size than the corresponding data items. That is, a key-payload pair (a record) is generally much larger than a key-index pair (the corresponding data item) because the index can be a pointer which may be only a few bytes in size. As a result, sorting and moving the key-index pairs (data items) can result in a significantly reduced amount of traffic in comparison to sorting and moving the key-payload pairs (original records).

Thus, the described aspects allow multiple PEs with access to a shared network-attached memory (such as FAM) to independently sort portions of data items corresponding to records, use the network-attached memory to store the intermediate construction of the burst tree data (tries), and generate work queue tasks to sort the intermediate burst tree data based on their keys and indices. By sorting only key-index pairs (data items), the system can effectively sort the original records without moving the actual original records. This can result in a more effective and efficient system with reduced communication and coordination between computing nodes.

The term "network-attached memory" can refer to a memory resource which can be accessed via a network by processing entities of multiple computing nodes. An example of a network-attached memory is a fabric-attached memory (FAM), as described below in relation to FIG. 1. Another example of a network-attached memory is a global fabric attached memory (GFAM), which can include memory of the same type or different types and which can be accessed by multiple processors directly connected to the GFAM or through a switch (e.g., a Computer Express Link (CXL) switch).

The terms "input data" or "input records" can refer to the "records" to be sorted. In this disclosure, the input data or records can be stored in a shared memory. Each record can contain a key and a payload. The system can extract the key from each record and generate a "data item" corresponding to a respective record. The data item can contain the extracted key and a corresponding index indicating (e.g., pointing to) a physical location in a network-attached memory at which the respective record is stored (a "key-index pair"). As described herein, the system can sort the data items (i.e., the key-index pairs) and write the sorted data items back to the shared memory, while leaving the records of the input data in their respective physical location.

The term "trie" refers to a digital tree or a prefix tree and can be a tree data structure used for locating specific keys from within a data set. In general, the keys can be strings or variable sized integers, nodes in the trie can represent characters, and links between the nodes can be defined not by the entire key, but by individual characters. Keys in the trie can be accessed by traversing the trie depth-first, following the links between nodes, which represent each character in the key. In this disclosure, the term "burst tree data" can refer to a trie which includes a range of one or more characters as prefixes and "buckets" which store the corresponding suffixes of the keys of the records being sorted.

The term "burst sort" refers to a sorting technique which, given a set of input data records to be sorted, can build a trie to store prefixes of strings by placing suffixes into "buckets." A bucket can be of a limited size and can include suffixes corresponding to the prefix characters indicated as its parent nodes in the trie. The bucket can "burst" into a new tree when the size of the bucket exceeds a predetermined threshold.

The terms "node" and "computing node" are used interchangeably in this disclosure and refer to a device, component, or hardware component which can operate as a source, an intermediary, or a destination of data, including e.g., a control packet, a connection packet, and a data packet. In this disclosure, a node may include one or more processing entities (PEs), as described below in relation to FIG. 1.

FIG. 1 illustrates an environment 100 which facilitates efficient burst sort based on network-attached memory, in accordance with an aspect of the present application. Environment 100 can include multiple computing nodes 102-1 to 102-N (where N is greater than or equal to 2). Computing nodes 102-1 to 102-N can be part of a cluster of computing nodes and can be interconnected by a network 104 to a network-attached memory (e.g., a FAM 106). FAM 106 can include multiple memory servers 108-1 to 108-M (where M is greater than or equal to 2). In some aspects, the network attached memory can include other globally accessible memory, such as CXL GFAM. M can be the same as N, or M can be different from N. Network 104 can include an interconnect (e.g., a throughput, low-latency interconnect) between processors and memories, which can be based on an open-source standard, a protocol defined by a standards body, or a proprietary implementation.

Each memory server can include a respective processor, memory, and network interface card (NIC). For example, memory server 108-1 can include a processor 110-1, a memory 112-1, and a NIC 114-1. Similarly, memory server 108-M can include a processor 110-M, a memory 112-M, and a NIC 114-M. The respective processor can include a central processing unit (CPU) that executes an operating system (OS) and other machine-readable instructions (including firmware such as a Basic Input/Output System (BIOS) and an application program) of the memory server. In some aspects, the respective processor can refer to another type of processor, such as a graphics processing unit (GPU) that handles specific computations in the memory server. The respective memory can be a persistent memory, a volatile memory, or a combination of both. The respective NIC can allow the memory server to communicate over network 104 based on one or more protocol layers.

Each computing node can also include a respective processor, local memory, and NIC. For example, computing node 102-1 can include a processor 115-1, a local memory 116-1, and a NIC 117-1. Similarly, computing node 102-N can include a processor 115-N, a local memory 116-N, and a NIC 117-N. In general, a computing node can include one or more processors. The respective local memory can be implemented using one or more memory devices, which can be any combination of the persistent memory and volatile memory described herein. The respective NIC can allow the computing node to communicate over network 104 based on one or more protocol layers.

A processor of a computing node can execute one or more processing entities (PEs), where a PE can be associated with a program under execution in the computing node. The program can be an application program or another type of program, such as an OS, firmware, and another type of machine-readable instructions. As shown in environment 100, processor 115-1 can execute a PE 118-1, and processor 115-N can execute PEs 118-P-1 to 118-P. Each PE can access data stored in FAM 106, by reading data from or writing data to FAM 106. Each PE can also perform computations on data read from FAM 106 or data to be written to FAM 106. Although certain numbers of PEs are illustrated in computing nodes 102-1 to 102-N, in some aspects, a different or a same number of PEs can execute in each computer node.

Computing node 102-1 can further include a burst sort system 120-1, which can include first phase functions 122-1 and second phase functions 124-1. PE 118-1 can execute instructions in first phase functions 122-1 and second phase functions 124-1. For example, first phase functions 122-1 can include instructions to determine records stored in FAM 106 (i.e., network-attached memory). A respective record can indicate a key and a corresponding index indicating a physical location in the shared memory at which the respective record is stored. First phase functions 122-1 can also include instruction to store, in a partition of local memory 116-1 (e.g., DRAM), burst tree data 128-1 obtained by performing a burst sort on a portion of the records. First phase functions 122-1 can also include instructions to move data stored in the DRAM partition to a partition of FAM 106 (e.g., memory 112-1) in response to a size of the stored data exceeding a predetermined threshold. Second phase functions 124-1 can include instructions to obtain sorted keys and corresponding indices for the records by sorting burst tree data stored in one or more partitions of FAM 106. Second phase functions 124-1 can write the sorted keys and indices to the shared memory (e.g., FAM 106), which facilitates a sorted retrieval of the records in FAM 106 while leaving the records in the respective physical location in FAM 106 (e.g., memory 112-1 and 112-M).

Computing node 102-1 can further include a FAM programming interface 130-1 and a FAM client 132-1. FAM programming interface 130-1 can include an application programming interface (API), a library, or any other program-accessible subsystem that is invoked in a computing node to perform an operation with respect to FAM 106, including a read operation, a write operation, a computation offloaded to FAM 106, or another operation involving data. In some aspects, FAM programming interface 130-1 can include an API that includes functions that are usable by computing nodes (or more specifically, by PEs in computing nodes) to manage FAM 106 and to access data of FAM 106. An example of such an API is an OpenFAM API. FAM client 132-1 can be a program executed in computing node 102-1 to manage the access of FAM 106, such as in response to calls to FAM programming interface 130-1.

Computing node 102-N can include similar elements with functionality as described above in relation to computing node 102-1, including: a burst sort system 120-N, which can include first phase functions 122-N and second phase functions 124-N with instructions as described above for, respectively, 122-1 and 124-1; a FAM programming interface 130-N; and a FAM client 132-N.

Figure 2:
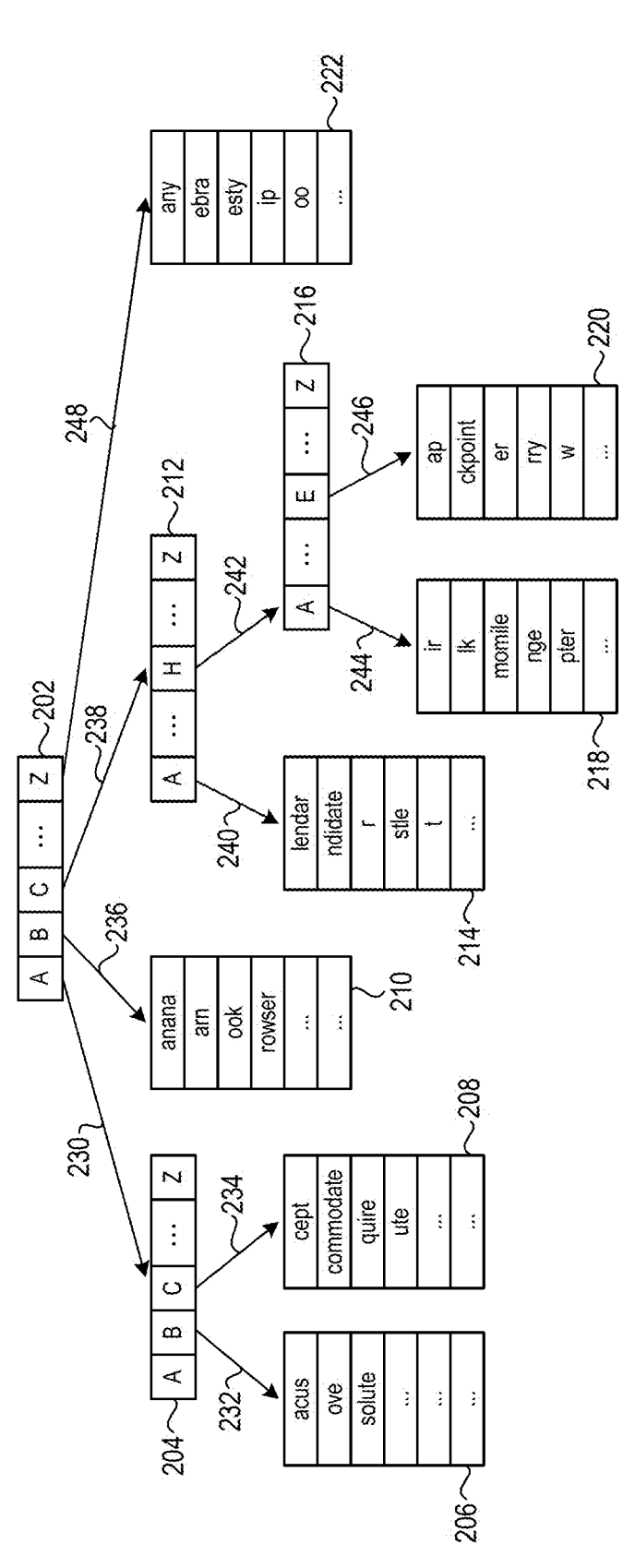
FIG. 2 illustrates a diagram of an example burst sort technique, including resulting burst tree data or "tries" with buckets, in accordance with an aspect of the present application.

FIG. 2 illustrates a diagram 200 of an example burst sort technique, including resulting burst tree data or tries with buckets, in accordance with an aspect of the present application. Diagram 200 includes a node 202 representing a prefix trie for records with keys which can contain one or more of, e.g., 26 characters of the alphabet. Node 202 can indicate all the possible characters in an input key, e.g., prefixes corresponding to each of the 26 letters of the alphabet. Performing burst sort on records with keys which contain one or more of the possible characters can result in additional tries (as in buckets or nodes 204, 212, 216) or buckets which can store the sorted input records (as in nodes 206, 208, 210, 214, 218, 220, and 222). In the burst tree depicted in diagram 200: input records with the prefix "AB" can be sorted (230, 232) into bucket 206 (e.g., abacus, above, absolute); input records with the prefix "AC" can be sorted (230, 234) into bucket 208 (e.g., accept, accommodate, acquire, acute); input records with the prefix "B" can be sorted (236) into bucket 210 (e.g., banana, barn, book, browser); input records with the prefix "CA" can be sorted (238, 240) into bucket 214 (e.g., calendar, candidate, car, castle, cat); input records with the prefix "CHA" can be sorted (238, 242, 244) into bucket 217 (e.g., chair, chalk, chamomile, change, chapter); input records with the prefix "CHE" can be sorted (238, 240, 246) into bucket 220 (e.g., cheap, checkpoint, cheer, cherry, and chew); and input records with the prefix "Z" can be sorted (248) into bucket 222 (e.g., zany, zebra, zesty, zip, zoo).

Buckets 206, 208, 210, 214, 218, 220, and 222 can be of a limited or predetermined maximum size. When the buckets reach the maximum size, the buckets can burst into a new trie. The buckets can contain burst tree data, and the system can store the dynamically sorted burst tree data into partitions in DRAM, as described below in relation to FIG. 3.

Figure 3:
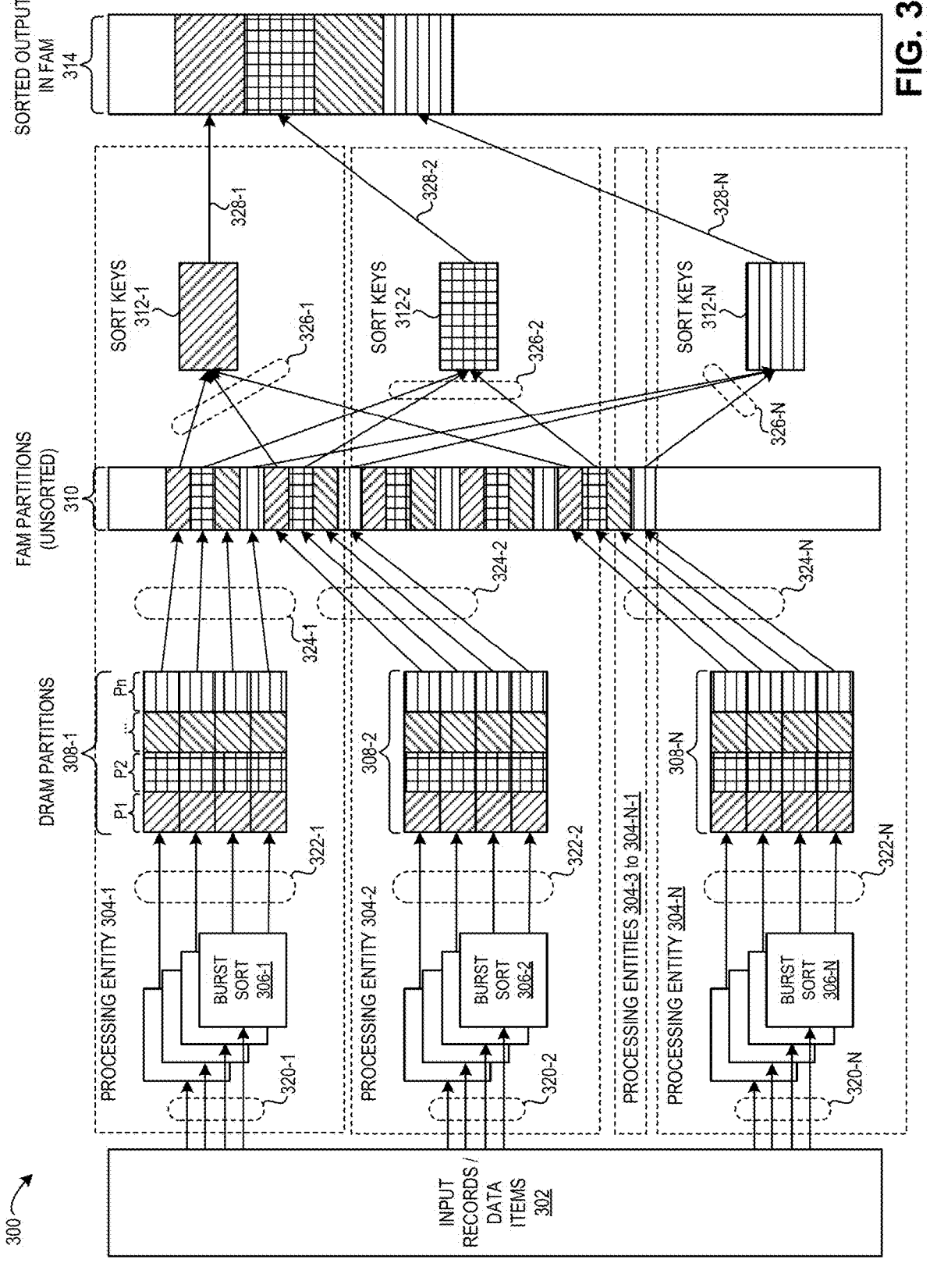
FIG. 3 illustrates a diagram of communications and operations which facilitate efficient burst sort based on network-attached memory, in accordance with an aspect of the present application.

FIG. 3 illustrates a diagram 300 of communications and operations which facilitate efficient burst sort based on network-attached memory, in accordance with an aspect of the present application. Diagram 300 can include: input records/data items 302 stored in a network-attached memory (e.g., FAM); a plurality of processing entities (PEs) 304 (including 304-1, 3-04-2, 304-3 to 304-N-1, and 304-N) associated with computing nodes coupled to a network of, e.g., switches; FAM partitions (unsorted) 310; and sorted output in FAM 314. In diagram 300, data items 302 can correspond to original input data records. Each record can include a key and a payload. For each record, the system can generate a corresponding data item which includes the key and a corresponding index indicating a physical location in the shared memory at which the respective original record is stored. The input records and the corresponding data items (i.e., the key-index pairs) can be stored in the same (e.g., as depicted in 302) or a different shared memory. As part of a first phase, each PE can obtain a portion of the data items, perform a burst sort on the obtained portion of the data items, store the resulting burst tree data in a DRAM partition in a depth-first manner, and, when the DRAM partition exceeds a certain threshold, move the burst tree data from DRAM to FAM, where the burst tree data is maintained in unsorted FAM partitions. As part of a second phase, each PE can sort the keys of the FAM partitions, e.g., by obtaining a task which corresponds to aggregating unsorted FAM partitions and sorting the burst tree data stored in the aggregated FAM partitions. Because the burst tree data (of the buckets) is already sorted, the sort procedure in the second phase may be a simple sort (e.g., a comparison sort, a quick sort, or a count sort). The sorted keys and corresponding indices of the data items can then be written back to FAM.

For example, in the first phase, each of PEs 304-1, 304-2, and 304-N can obtain a portion of data items 302 (via, respectively, communications 320-1, 320-2, and 320-N), perform a burst sort on the obtained portions of the data items (respectively, operations 306-1, 306-2, and 306-N), store the burst tree data in DRAM partitions (via, respectively, communications 322-1, 322-2, and 322-N to DRAM partitions 308-1, 308-2, and 308-N) and, when a DRAM partition exceeds a certain threshold, move the burst tree data to FAM partitions 310 (respectively, via communications 324-1, 324-2, and 324-N). The burst tree data (e.g., the contents of buckets 206, 208, 210, 214, 218, 220, and 222) can be written depth first into DRAM, which maintains the sorted order of the data items in the prefix tries. Metadata can also be written along with the burst tree data, including updating common structures, e.g., a count of how many partitions are written into FAM. DRAM partitions can be indicated by columns, e.g., in 308-1 as P1, P2, . . . , Pn. Burst tree data stored in the DRAM partitions may include prefix tries which share similar prefixes, as indicated by the similar shading patterns in columns P1-Pn in 308-1 (and 308-2 and 308-N). Burst tree data which has been moved to FAM partitions 310 is depicted with the same shading to indicate that tasks generated for sorting the burst tree data in the unsorted FAM partitions can be tasks relating to prefix tries which share similar prefixes, and correspondingly, including data item keys which have already been sorted in each individual bucket.

In the second phase, tasks can be generated and stored in a work queue. A task can correspond to sorting burst tree data stored in an indicated FAM partition. For example, PEs 304-1, 304-2, and 304-N can each obtain tasks from the work queue (not shown), where a task can indicate FAM partitions storing burst tree data with similar prefixes. The PEs can each aggregate the indicated FAM partitions (as shown in, respectively, communications 326-1, 326-2, and 326-N) and sort the keys of the data items stored as ordered burst tree or prefix trie data in FAM partitions 310 (respectively, operations 312-1, 312-2, and 312-N). If the number of keys in a given task exceeds a predetermined number, the system can create a new task for keys which are not included for processing in the given task and insert the new task into the work queue. For example, the system can further partition these keys by using burst sort to another level, expanding the prefix size, and reducing the number of keys present in each of the resulting prefix partitions.

The result of sorting the keys (i.e., of operations 312-1, 312-2 and 312-N) can include the sorted keys and their corresponding indices, which can be stored back to the FAM as sorted output in FAM 314 (via, respectively, communications 328-1, 328-2, and 328-N). The resulting sorted output in FAM, i.e., the sorted indices of the sorted data items, can be used in subsequent retrieval or access operations, as described below in relation to FIG. 4.

Figure 4:
FIG. 4 illustrates a diagram of data stored in a network-attached memory subsequent to performing efficient burst sort based on network-attached memory, in accordance with an aspect of the present application.

FIG. 4 illustrates a diagram 400 of data stored in a network-attached memory subsequent to performing efficient burst sort based on network-attached memory, in accordance with an aspect of the present application. Diagram 400 depicts an index table 410 and sorted indices in FAM 420, which can be generated by the process described above for the data items (i.e., the key-index pairs) in FIG. 3 (including the burst sort 306 operation of the first phase and the sort keys 312 operation of the second phase). Index table 410 can be a top-level prefix index table and can include pointers to groupings of sorted indices in FAM 420. Sorted indices in FAM 420 can include the sorted keys of the data items with the corresponding pointers and can also correspond to sorted output in FAM 314 of FIG. 3. When index table 410 and sorted indices in FAM 420 have been generated as a result of the above-described operations of the first and second phases in FIG. 3, sorted indices in FAM 420 contains pointers to the actual physical location of original input records in FAM 430 (as illustrated by 442-1, 442-2, and 442-N).

Thus, by writing the sorted keys and indices of the data items to FAM (as in 314 and 420), the described aspects facilitate a sorted retrieval of the original input records in FAM without moving any of the original input records in FAM. For example, subsequent to the sorted keys and indices of the data items being written to FAM, an Open-FAM operation or call such as fam_gather( ) can be used to generate a request for data stored in the FAM. The request can include a plurality of the sorted indices. The system can return the requested data from the FAM in a sorted order based on the sorted indices of the sorted data items previously written to FAM, which facilitates a sorted retrieval of the stored FAM records while leaving the FAM records in their respective physical location, i.e., without needing to move the actual and originally stored records in FAM (depicted as original input records in FAM 430 in FIG. 4).

FIGS. 3-4 also demonstrate that the PEs can perform load-balancing for sorting the data items corresponding to input records stored in FAM because each PE can obtain a number or amount of data items based on the available processing capability of a respective PE. The PEs may use a shared "offset" variable between the nodes, and this offset variable can be atomically incremented during allocation of a range of input data to a respective PE. The obtained value may indicate the block offset, based on "<offset>*<block size>," which can ensure that only a single PE is to operate on a given range of input data. The processed portion or range of the data items by each PE can vary in size, which over time can eliminate the need for performing any range partitioning of the input records and corresponding data items and can further eliminate the communication overhead involved in range partitioning techniques.

By dynamically partitioning the keys of the data items corresponding to the input records, the described aspects can efficiently perform the burst sort based on the quantity of data and not any limits on values, which can increase the utilization rate of PEs and avoid empty buckets. Furthermore, because each PE can operate independently of the others, the described operations can result in minimizing communication and coordination between the PEs while efficiently sorting the indices for the input records.

Incremental updates to the input records can be handled by one or more PEs independently performing the burst sort on the updated data items corresponding to the updated records until the burst tree data associated with the updated data items has been stored in a respective DRAM partition and moved to a respective FAM partition (i.e., through the end of the first phase of operations). This allows the system to refrain from performing the burst sort on data items corresponding to the records previously stored in FAM. The system, via the independently operating PEs, can subsequently obtain the sorted data items (including the sorted indices) for the updated records by sorting the burst tree data stored in the FAM partitions.

Figure 5:
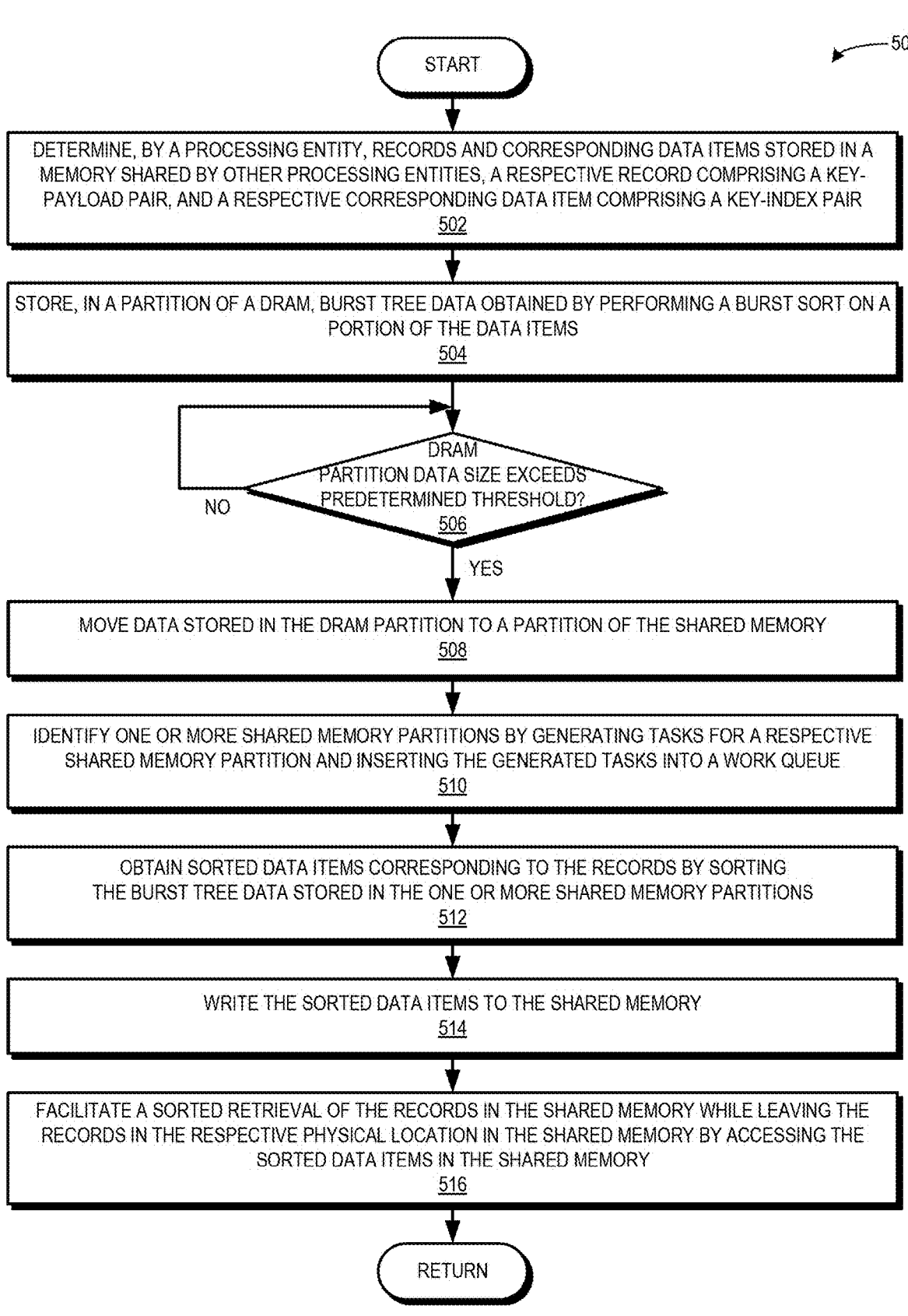
FIG. 5 presents a flowchart illustrating a method which facilitates efficient burst sort based on network-attached memory, in accordance with an aspect of the present application.

FIG. 5 presents a flowchart 500 illustrating a method which facilitates efficient burst sort based on network-attached memory, in accordance with an aspect of the present application. During operation, the system determines, by a processing entity, records and corresponding data items stored in a memory shared by other processing entities, a respective record comprising a key and a payload (a key-payload pair), and a respective corresponding data item comprising the key and a corresponding index indicating a physical location in the shared memory at which the respective record is stored (a key-index pair) (operation 502). The records and data items may be stored in a network-attached memory, as described above in relation to input records/data items 302 stored in FAM of FIG. 3. The processing entities can be associated with multiple computing nodes coupled to a network of switches (e.g., a switch "fabric"), as described above in relation to computing nodes 102 and network 104 of FIG. 1, and the shared memory may be a memory resource attached to the network of switches, as described above in relation to memory servers 108 of FAM 106 of FIG. 1.

The system stores, in a partition of a DRAM, burst tree data obtained by performing a burst sort on a portion of the data items (operation 504), as described above in relation to communications 322 and DRAM partitions 308 of FIG. 3. If the size of stored data in the DRAM partition exceeds a predetermined threshold (decision 506), the system moves the data stored in the DRAM partition to a partition of the shared memory (operation 508). For example, burst tree data stored in DRAM partitions 308 can be moved to unsorted FAM partitions 310 via communications 324, as in FIG. 3. If the size of the stored data in the DRAM partition does not exceed a predetermined threshold (decision 506), the operation waits until the size of the stored data in the DRAM partition exceeds the predetermined threshold.

The system identifies one or more shared memory partitions by generating tasks for a respective shared memory partition and inserting the generated tasks into a work queue (operation 510), as described above in relation to PEs 304-1, 304-2, and 304-N obtaining tasks from a work queue and aggregating the indicated FAM partitions shown in, respectively, 326-1, 326-2, and 326-N. In addition, if the number of keys in a generated task exceeds a predetermined number, the system creates a new task for keys which are not included for processing in the generated task and inserts the new task into the work queue.

The system obtains sorted data items (i.e., sorted key-index pairs) for the records by sorting the burst tree data stored in the one or more shared memory partitions (operation 512). For example, as described above in relation to FIG. 3, PEs 304-1, 304-2, and 304-N can perform the sort keys function (depicted as, respectively, operations 312-1, 312-2, and 312-N) on one or more unsorted FAM partitions 310 (indicated, respectively, as aggregated FAM partitions 326-1, 326-2, and 326-N) to obtain the sorted keys and corresponding indices. The PEs can also sort the burst tree data stored in the one or more shared memory partitions in response to acquiring tasks from the work queue. The system writes the sorted data items to the shared memory (operation 514), e.g., as described above in relation to operations 328-1, 328-2, and 328-N and sorted output in FAM 314 of FIG. 3. The system facilitates a sorted retrieval of the records in the shared memory while leaving the records in the respective physical location in the shared memory by accessing the sorted data items (i.e., sorted key-index pairs) in the shared memory (operation 516). The sorted output is also depicted above as the sorted indices in FAM 420, along with the original (and unmoved) input records in FAM 430 of FIG. 4, where the sorted indices depicted by 442-1, 442-2, and 442-N indicate the pointers to the original locations of the records in FAM. The operation returns.

Figure 6:
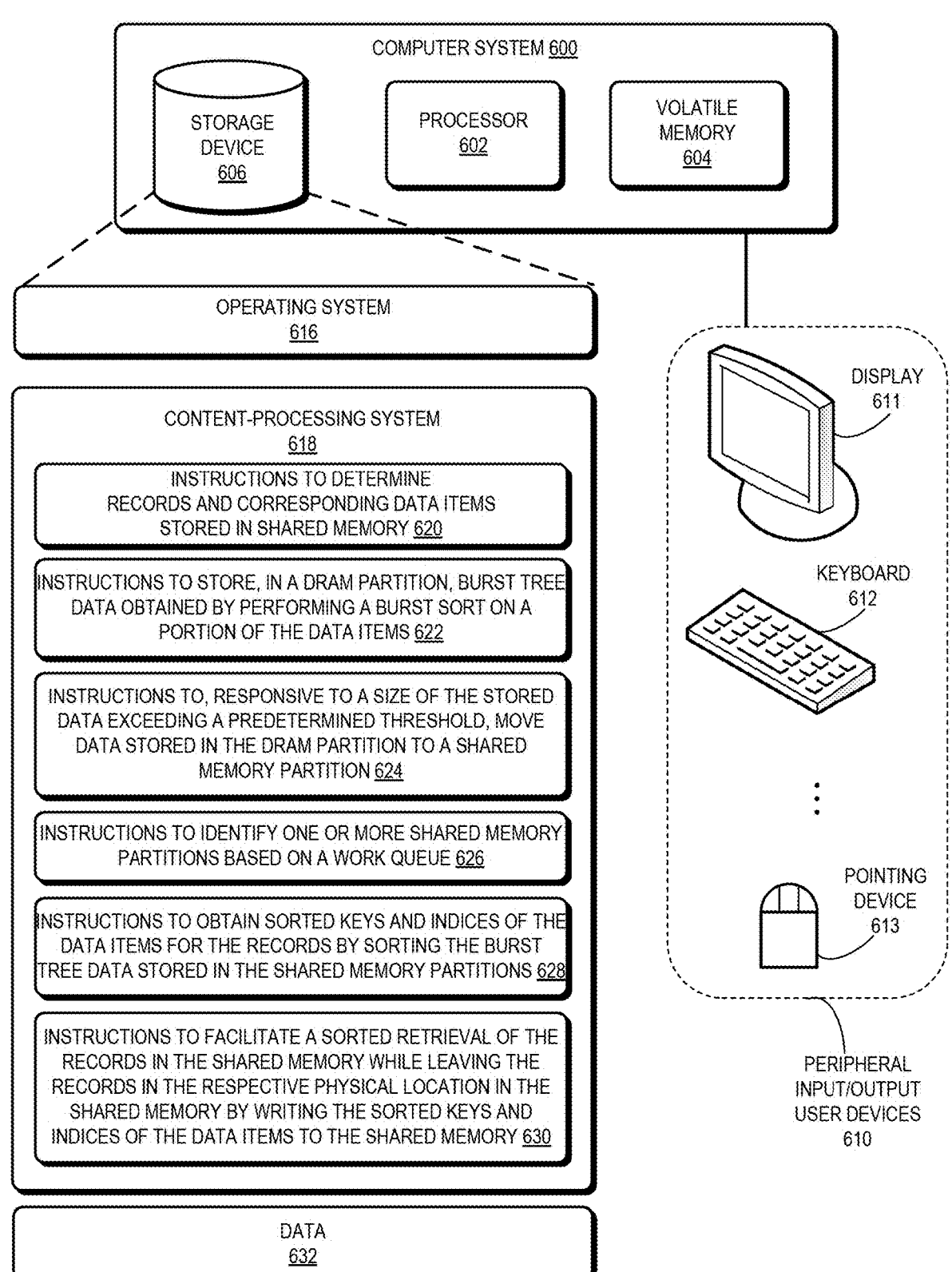
FIG. 6 illustrates a computer system which facilitates efficient burst sort based on network-attached memory, in accordance with an aspect of the present application.

FIG. 6 illustrates a computer system 600 which facilitates efficient burst sort based on network-attached memory, in accordance with an aspect of the present application. Computer system 600 includes a processor 602, a memory 604, and a storage device 606. Memory 604 can include a volatile memory (e.g., random access memory (RAM)) that serves as a managed memory and can be used to store one or more memory pools. Furthermore, computer system 600 can be coupled to peripheral input/output (I/O) user devices 610 (e.g., a display device 611, a keyboard 612, and a pointing device 613). Storage device 606 includes a non-transitory computer-readable storage medium and stores an operating system 616, a content-processing system 618, and data 632. Computer system 600 may include fewer or more entities or instructions than those shown in FIG. 6.

Content-processing system 618 can include instructions, which when executed by computer system 600, can cause computer system 600 to perform methods and/or processes described in this disclosure. Specifically, content-processing system 618 may include instructions 620 to determine, by a processing entity, records and corresponding data items stored in a memory shared by other processing entities, wherein a respective record comprises a key and a payload, and wherein a respective corresponding data item comprises the key and a corresponding index indicating a physical location in the shared memory at which the respective record is stored. An example of input records and data items is described above in relation to FAM 106 of FIG. 1 and input records/data items 302 of FIG. 3. Content-processing system 618 may include instructions 622 to store, in a DRAM partition, burst tree data obtained by performing a burst sort on a portion of the data items, as described above in relation to first phase functions 122 of FIG. 1 as well as communications 322 and DRAM partitions 308 of FIG. 3

Content-processing system 618 may further include instructions 624 to, responsive to a size of the stored data exceeding a predetermined threshold, move data stored in the DRAM partition to a shared memory partition. An example of moving data from DRAM partitions to shared memory partitions is described above in relation to communications 324 and FAM partitions 310 of FIG. 3. Content-processing system 618 may include instructions 626 to identify one or more shared memory partitions based on a work queue. Generation of tasks in a work queue are described above in relation to, e.g., operation 510 of FIG. 5. Content-processing system 618 can also include instructions 628 to obtain sorted keys and corresponding indices of the data items for the records by sorting the burst tree data stored in the one or more shared memory partitions. Sorting the stored burst tree data (prefix tries) is described above in relation to second phase functions 124 of FIG. 1 and sort keys functions 312 of FIG. 3. Content-processing system 618 can include instructions 630 to facilitate a sorted retrieval of the records in the shared memory while leaving the records in the respective physical location in the shared memory by writing the sorted keys and indices of the data items to the shared memory. The improvement in overall efficiency is described above in relation to, e.g., operations 514 and 516 of FIG. 5.

Data 632 can include any data that is required as input or that is generated as output by the methods, operations, communications, and/or processes described in this disclosure. Specifically, data 632 can store at least: a record; a key; an index; a table of keys and corresponding indices; a sorted table of indices; burst tree data; a trie; a prefix tree; a digital tree; one or more prefixes; a range of prefixes; one or more suffixes; a bucket of suffixes; an indicator of a DRAM partition or a shared memory partition; sorted partitions; unsorted partitions; an indicator of a shared memory resource; a portion of a record; a size of a record; a total data size; a predetermined threshold; a predetermined number; an indicator or identifier of a processing entity or computing node; an updated record; a task; a work task; a queue; a work task queue; aggregated partitions; a number of keys; an indicator or results of a burst sort, a comparison sort, a quick sort, or a count sort; a request for data; and response data.

Content-processing system 618 may include more instructions than those shown in FIG. 6. For example, content-processing system 618 can also store instructions for executing the operations described above in relation to: the environment of FIG. 1; the communications and operations of FIG. 3; the operations depicted in flowchart 500 of FIG. 5; and the instructions of computer-readable medium 700 in FIG. 7.

FIG. 7 illustrates a computer-readable medium (CRM) 700 which facilitates efficient burst sort based on network-attached memory, in accordance with an aspect of the present application. CRM 700 can be a non-transitory computer-readable medium or device storing instructions that when executed by a computer or processor cause the computer or processor to perform a method. CRM 700 can store instructions 710 to determine, by a processing entity, records and corresponding data items stored in a memory shared by other processing entities. A respective record comprises a key and a payload, and a respective corresponding data item comprises the key and a corresponding index indicating a physical location in the shared memory at which the respective record is stored, as described above in relation to FAM 106 of FIG. 1 and input records/data items 302 of FIG. 3. CRM 700 can also store instructions 712 to perform a burst sort on a portion of the data items, as described above in relation to FAM-based burst sort system 120 of FIG. 1 and burst sort functions 306 of FIG. 3. CRM 700 can store instructions 714 to store, in a DRAM partition, burst tree data obtained from the burst sort, as described above in relation to first phase functions 122 of FIG. 1 and communications 322 and DRAM partitions 308 of FIG. 3. CRM 700 can store instructions 716 to move data stored in the DRAM partition to a partition of the shared memory in response to a size of the stored data exceeding a predetermined threshold, as described above in relation to communications 324 and FAM partitions 310 of FIG. 3.

CRM 700 can additionally store instructions 718 to sort the burst tree data stored in one or more shared memory partitions, as described above in relation to second phase functions 124 of FIG. 1 and sort keys functions 312 of FIG. 3. CRM 700 can store instructions 720 to obtain sorted keys and corresponding indices of the data items for the records based on the sorted burst tree data, as described above in relation to 312 of FIG. 3. CRM 700 can store instructions 722 to write the sorted keys and corresponding indices of the data items to the shared memory. Writing the sorted keys and corresponding indices to the shared memory facilitates a sorted retrieval of the records in the shared memory while leaving the records in the respective physical location in the shared memory, as described above in relation to FAM 106 of FIG. 1 and communications 328 and sorted output in FAM 314 of FIG. 3. CRM 700 can also store instructions 724 to process a request for one or more of the records stored in the shared memory, the request including one or more of the sorted indices, as described above in relation to operation 514 of FIG. 5.

CRM 700 may include more instructions than those shown in FIG. 7. For example, CRM 700 can also store instructions for executing the operations described above in relation to: the environment of FIG. 1; the communications and operations of FIG. 3; the operations depicted in flowchart 500 of FIG. 5; and the instructions of content-processing system 618 of computer system 600 in FIG. 6.

The described aspects provide a specific implementation and technological solution (e.g., facilitating improved performance in sorting large volumes of data across multiple distributed nodes) by providing efficient burst sort based on network-attached memory (e.g., a FAM-based burst sort technique) which can include burst sort, data movement, and sorting to obtain sorted indices without moving the original data. In the described technological solution, multiple PEs can operate independently and perform load-balancing by processing a portion of the records in parallel. The size of a portion processed by a PE can depend on the available computing and resource capabilities of the PE. The described aspects thus provide a solution to a technological problem in the computer arts (e.g., sorting voluminous data in a distributed system using multiple nodes or PEs acting independently and in parallel). The described aspects further integrate into a practical application because they are necessarily rooted in computer technology (e.g., increasing the efficiency of communication in sorting a large volume of data in a distributed system).

In general, the disclosed aspects provide a method, a computer system, and a computer-readable medium which facilitate efficient burst sort based on network-attached memory. During operation, the system determines, by a processing entity, records and data items stored in a memory shared by other processing entities, a respective record comprising a key and a payload, and a respective corresponding data item comprising the key and a corresponding index indicating a physical location in the shared memory at which the respective record is stored. The system stores, in a DRAM partition, burst tree data obtained by performing a burst sort on a portion of the data items. The system moves data stored in the DRAM partition to a partition of the shared memory in response to a size of the stored data exceeding a predetermined threshold. The system obtains sorted data items corresponding to the records by sorting the burst tree data stored in one or more shared memory partitions. The system writes the sorted data items to the shared memory. The system facilitates a sorted retrieval of the records in the shared memory while leaving the records in the respective physical location in the shared memory by accessing the sorted data items in the shared memory.

In a variation on this aspect, the processing entities are associated with computing nodes coupled to a network of switches and the shared memory comprises a memory resource attached to the network of switches.

In a further variation on this aspect, the system performs, by the processing entities, load-balancing for sorting the records stored in the shared memory. A respective processing entity obtains the portion of the data items, wherein a size of the portion obtained by the respective processing entity is based on an available processing capability of the respective processing entity. The respective processing entity performs the burst sort on the obtained portion and stores the burst tree data in a respective DRAM partition. The respective processing entity moves the data from the respective DRAM partition to a respective shared memory partition independently of other processing entities, and eliminates communication and coordination between the processing entities while sorting the records stored in the shared memory.

In a further variation, in response to updating the records stored in the shared memory, the system: determines updated data items corresponding to the updated records; performs the burst sort only on the updated data items until the burst tree data associated with the updated data items has been stored in a respective DRAM partition and moved to a respective shared memory partition; refrains from performing the burst sort on data items corresponding to records previously stored in the shared memory; and obtains the sorted data items by sorting the burst tree data stored in the one or more shared memory partitions.

In a further variation, the system maintains the burst tree data stored in the DRAM partition as a prefix tree in a sorted order. The system maintains the shared memory partitions in an unsorted order prior to the processing entity sorting the burst tree data stored in the shared memory partitions. The shared memory partitions comprise partitions associated with a range of prefixes.

In a further variation, the system identifies the one or more shared memory partitions by: generating tasks for a respective shared memory partition, wherein the respective shared memory partition is associated with keys sharing common prefixes, and wherein a respective task corresponds to sorting burst tree data stored in the respective shared memory partition; inserting the generated tasks into a work queue; and sorting, by the processing entity and the other processing entities, the respective shared memory partition in response to acquiring the respective task from the work queue.

In a further variation, the system determines whether a number of keys in a first generated task exceeds a predetermined number. The system creates a new task for keys not included for processing in the first generated task in response to the number of keys in the first generated task exceeding the predetermined number. The system inserts the new task into the work queue.

In a further variation, sorting the burst tree data stored in the one or more shared memory partitions is based on at least one of: a comparison sort; a quick sort; or a count sort.

In a further variation, the system receives a request for one or more of the records stored in the shared memory, wherein the request includes a plurality of the sorted indices, and returns the requested one or more records in a sorted order from the shared memory based on indices of the sorted data items previously written to the shared memory.

In another aspect, a computer system comprises a processor and a storage device storing instructions. The instructions are to determine, by a processing entity, records and corresponding data items stored in a memory shared by other processing entities, wherein a respective record comprises a key and a payload, and wherein a respective corresponding data item comprises the key and a corresponding index indicating a physical location in the shared memory at which the respective record is stored. The instructions are further to store, in a DRAM partition, burst tree data obtained by performing a burst sort on a portion of the data items. The instructions are further to, responsive to a size of the stored data exceeding a predetermined threshold, move data stored in the DRAM partition to a partition of the shared memory. The instructions are further to identify one or more shared memory partitions based on a work queue. The instructions are further to obtain sorted keys and corresponding indices of the data items for the records by sorting the burst tree data stored in the one or more shared memory partitions. The instructions are further to facilitate a sorted retrieval of the records in the shared memory while leaving the records in the respective physical location in the shared memory by writing the sorted keys and indices of the data items to the shared memory. The computer system may include a content-processing system which includes more instructions, e.g., the instructions to perform the operations described herein, including in relation to: the environment of FIG. 1; the communications and operations of FIG. 3; the operations depicted in flowchart 500 of FIG. 5; and the instructions of CRM 700 in FIG. 7.

In yet another aspect, a non-transitory computer-readable storage medium (CRM) stores instructions to determine, by a processing entity, records and corresponding data items stored in a memory shared by other processing entities, a respective record comprising a key and a payload, and a respective corresponding data item comprising the key and a corresponding index indicating a physical location in the shared memory at which the respective record is stored. The instructions are further to perform a burst sort on a portion of the data items. The instructions are further to store, in a DRAM partition, burst tree data obtained from the burst sort. The instructions are further to move data stored in the DRAM partition to a partition of the shared memory in response to a size of the stored data exceeding a predetermined threshold. The instructions are further to sort the burst tree data stored in one or more shared memory partitions. The instructions are further to obtain sorted keys and corresponding indices of the data items for the records based on the sorted burst tree data. The instructions are further to write the sorted keys and corresponding indices of the data items to the shared memory, wherein writing the sorted keys and corresponding indices of the data items to the shared memory facilitates a sorted retrieval of the records in the shared memory while leaving the records in the respective physical location in the shared memory. The CRM can also store instructions for executing the operations described above in relation to: the environment of FIG. 1; the communications and operations of FIG. 3; the operations depicted in flowchart 500 of FIG. 5; and the instructions of content-processing system 618 of computer system 600 in FIG. 6.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method, comprising:

determining, by a processing entity, records and corresponding data items stored in a memory shared by other processing entities, a respective record comprising a key and a payload, and a respective corresponding data item comprising the key and a corresponding index indicating a physical location in the shared memory at which the respective record is stored;

obtaining, by the processing entity, a portion of the data items, the portion of a size based on an available processing capacity of the processing entity;

obtaining burst tree data by performing a burst sort on the obtained portion of the data items;

storing the burst tree data in a partition of a dynamic random access memory (DRAM);

moving data stored in the DRAM partition to a partition of the shared memory in response to a size of the stored data exceeding a predetermined threshold;

maintaining the shared memory partition and one or more shared memory partitions in an unsorted order;

obtaining sorted data items corresponding to the records by sorting the burst tree data stored in the one or more shared memory partitions;

writing the sorted data items to the shared memory; and facilitating a sorted retrieval of the records in the shared memory while leaving the records in the respective physical location in the shared memory by accessing the sorted data items in the shared memory.

2. The method of claim 1:

the processing entities associated with computing nodes coupled to a network of switches; and the shared memory comprising a memory resource attached to the network of switches.

3. The method of claim 1, further comprising:

performing, by the processing entities, load-balancing for sorting the records stored in the shared memory by:

obtaining, by a respective processing entity, the portion of the data items, wherein a size of the portion obtained by the respective processing entity is based on an available processing capability of the respective processing entity;

performing, by the respective processing entity, the burst sort on the obtained portion;

storing, by the respective processing entity, the burst tree data in a respective DRAM partition;

moving, by the respective processing entity, the data from the respective DRAM partition to a respective shared memory partition independently of other processing entities; and eliminating communication and coordination between the processing entities while sorting the records stored in the shared memory.

4. The method of claim 1, further comprising:

in response to updating the records stored in the shared memory:

determining updated data items corresponding to the updated records;

performing the burst sort only on the updated data items until the burst tree data associated with the updated data items has been stored in a respective DRAM partition and moved to a respective shared memory partition;

refraining from performing the burst sort on data items corresponding to records previously stored in the shared memory; and obtaining the sorted data items by sorting the burst tree data stored in the one or more shared memory partitions.

5. The method of claim 1, further comprising:

maintaining the burst tree data stored in the DRAM partition as a prefix tree in a sorted order; and maintaining the shared memory partitions in an unsorted order prior to the processing entity sorting the burst tree data stored in the shared memory partitions, the shared memory partitions comprising partitions associated with a range of prefixes.

6. The method of claim 1, further comprising:

identifying the one or more shared memory partitions by:

generating tasks for a respective shared memory partition, wherein the respective shared memory partition is associated with keys sharing common prefixes, and wherein a respective task corresponds to sorting burst tree data stored in the respective shared memory partition;

inserting the generated tasks into a work queue; and sorting, by the processing entity and the other processing entities, the respective shared memory partition in response to acquiring the respective task from the work queue.

7. The method of claim 6, further comprising:

determining whether a number of keys in a first generated task exceeds a predetermined number;

creating a new task for keys not included for processing in the first generated task in response to the number of keys in the first generated task exceeding the predetermined number; and inserting the new task into the work queue.

8. The method of claim 1, wherein sorting the burst tree data stored in the one or more shared memory partitions is based on at least one of:

a comparison sort;

a quick sort; or a count sort.

9. The method of claim 1, further comprising:

receiving a request for one or more of the records stored in the shared memory, wherein the request includes a plurality of the sorted indices; and returning the requested one or more records in a sorted order from the shared memory based on indices of the sorted data items previously written to the shared memory.

10. A computer system, comprising:

a processor; and a storage device storing instructions to:

determine, by a processing entity, records and corresponding data items stored in a memory shared by other processing entities, wherein a respective record comprises a key and a payload, and wherein a respective corresponding data item comprises the key and a corresponding index indicating a physical location in the shared memory at which the respective record is stored;

obtain, by the processing entity, a portion of the data items, the portion of a size based on an available processing capacity of the processing entity;

obtain burst tree data by performing a burst sort on the obtained portion of the data items;

store the burst tree data in a partition of a dynamic random access memory (DRAM):

responsive to a size of the stored data exceeding a predetermined threshold, move data stored in the DRAM partition to a partition of the shared memory;

identify one or more shared memory partitions based on a work queue;

maintain the shared memory partition and the one or more shared memory partitions in an unsorted order;

obtain sorted keys and corresponding indices of the data items for the records by sorting the burst tree data stored in the one or more shared memory partitions; and facilitate a sorted retrieval of the records in the shared memory while leaving the records in the respective physical location in the shared memory by writing the sorted keys and indices of the data items to the shared memory.

11. The computer system of claim 10,
wherein the processing entities are associated with computing nodes coupled to a network of switches, and
wherein the shared memory comprises a memory resource attached to the network of switches.

12. The computer system of claim 10, the instructions further to:

perform, by the processing entities, load-balancing for sorting the records stored in the shared memory by:

obtaining, by a respective processing entity, the portion of the records stored in the shared memory, wherein a size of the portion obtained by the respective processing entity is based on an available processing capability of the respective processing entity;

performing, by the respective processing entity, the burst sort on the obtained portion;

storing, by the respective processing entity, the burst tree data in a respective DRAM partition;

moving, by the respective processing entity, the data from the respective DRAM partition to a respective shared memory partition independently of other processing entities; and eliminating communication and coordination between the processing entities while sorting the records stored in the shared memory.

13. The computer system of claim 10, the instructions further to:

in response to updating the records stored in the shared memory:

perform the burst sort only on the updated records until the burst tree data associated with the updated records has been stored in a respective DRAM partition and moved to a respective shared memory partition;

refrain from performing the burst sort on the records previously stored in the shared memory; and obtain the sorted indices for the updated records by sorting the burst tree data stored in the one or more shared memory partitions.

14. The computer system of claim 10, the instructions further to:

maintain the burst tree data stored in the DRAM partition as a prefix tree in a sorted order; and maintain the shared memory partitions in an unsorted order prior to the processing entity sorting the burst tree data stored in the shared memory partitions, the shared memory partitions comprising partitions associated with a range of prefixes.

15. The computer system of claim 10, the instructions to identify the one or more shared memory partitions further to:

generate tasks for a respective shared memory partition, wherein the respective shared memory partition is associated with keys sharing common prefixes, and wherein a respective task corresponds to sorting burst tree data stored in the respective shared memory partition;

insert the generated tasks into a work queue; and sort, by the processing entity and the other processing entities, the respective shared memory partition in response to acquiring the respective task from the work queue.

16. The computer system of claim 10, the instructions further to sort the burst tree data stored in the one or more shared memory partitions based on at least one of:

a comparison sort;

a quick sort; or a count sort.

17. The computer system of claim 10, the instructions further to:

receiving a request for data stored in the shared memory, wherein the request includes a plurality of the sorted indices; and returning data in a sorted order from the shared memory based on the sorted indices previously written to the shared memory.

18. A non-transitory computer-readable medium storing instructions to:

determine, by a processing entity, records and corresponding data items stored in a memory shared by other processing entities, a respective record comprising a key and a payload, and a respective corresponding data item comprising the key and a corresponding index indicating a physical location in the shared memory at which the respective record is stored;

obtain, by the processing entity, a portion of the data items, the portion of a size based on an available processing capacity of the processing entity;

perform a burst sort on the obtained portion of the data items;

store, in a partition of a dynamic random access memory (DRAM), burst tree data obtained from the burst sort;

move data stored in the DRAM partition to a partition of the shared memory in response to a size of the stored data exceeding a predetermined threshold;

maintain the shared memory partition and one or more shared memory partitions in an unsorted order;

sort the burst tree data stored in the one or more shared memory partitions;

obtain sorted keys and corresponding indices of the data items for the records based on the sorted burst tree data; and write the sorted keys and corresponding indices of the data items to the shared memory, wherein writing the sorted keys and corresponding indices of the data items to the shared memory facilitates a sorted retrieval of the records in the shared memory while leaving the records in the respective physical location in the shared memory.

19. The non-transitory computer-readable medium of claim 18, the instructions further to perform, by the processing entities, load-balancing for sorting the records stored in the shared memory, the instructions to perform the load-balancing further to:

obtain, by a respective processing entity, the portion of the records stored in the shared memory, wherein a size of the portion obtained by the respective processing entity is based on an available processing capability of the respective processing entity;

perform, by the respective processing entity, the burst sort on the obtained portion;

store, by the respective processing entity, the burst tree data in a respective DRAM partition;

move, by the respective processing entity, the data from the respective DRAM partition to a respective shared memory partition independently of other processing entities; and eliminate communication and coordination between the processing entities while sorting the records stored in the shared memory.

20. The non-transitory computer-readable medium of claim 18, the instructions further to process a request for one or more of the records stored in the shared memory by:

receiving a request for the one or more records stored in the shared memory, wherein the request includes one or more of the sorted indices; and in response to receiving the request, returning the requested one or more records in a sorted order from the shared memory based on the sorted indices previously written to the shared memory.

\*    \*    \*    \*    \*